(12) United States Patent
Ni

(10) Patent No.: US 11,717,114 B2
(45) Date of Patent: Aug. 8, 2023

(54) MULTIFUNCTIONAL FOOD PROCESSOR

(71) Applicant: KINGCLEAN ELECTRIC GREEN TECHNOLOGY (SUZHOU) CO., LTD., Suzhou (CN)

(72) Inventor: Zugen Ni, Suzhou (CN)

(73) Assignee: KINGCLEAN ELECTRIC GREEN TECHNOLOGY (SUZHOU) CO., LTD., Suzhou (CN)

( * ) Notice: Subject to any disclaimer, the term of this patent is extended or adjusted under 35 U.S.C. 154(b) by 307 days.

(21) Appl. No.: 16/487,391

(22) PCT Filed: Mar. 15, 2018

(86) PCT No.: PCT/CN2018/079148
§ 371 (c)(1),
(2) Date: Aug. 20, 2019

(87) PCT Pub. No.: WO2018/171505
PCT Pub. Date: Sep. 27, 2018

(65) Prior Publication Data
US 2020/0060478 A1    Feb. 27, 2020

(30) Foreign Application Priority Data
Mar. 18, 2017  (CN) .......................... 201710162529.7

(51) Int. Cl.
*A47J 43/046*   (2006.01)
*A47J 43/06*    (2006.01)

(52) U.S. Cl.
CPC ............. *A47J 43/046* (2013.01); *A47J 43/06* (2013.01)

(58) Field of Classification Search
CPC ...... A47J 43/046; A47J 43/0722; A47J 43/06; A47J 43/0716; A47J 43/085; A47J 44/00; A47J 19/06; A47J 2043/04454
(Continued)

(56) References Cited

U.S. PATENT DOCUMENTS

2006/0027107 A1   2/2006 Lin
2011/0011281 A1*  1/2011 Allen .................... A47J 43/046
                                                            99/537

(Continued)

FOREIGN PATENT DOCUMENTS

CN   200991174 Y   12/2007
CN   101912227 A   12/2010
(Continued)

OTHER PUBLICATIONS

Sheng Dingxun, Espacenet Translated Specification of Patent Application of CN 105816071A (Year: 2016).*
(Continued)

*Primary Examiner* — Elizabeth Insler
(74) *Attorney, Agent, or Firm* — Maschoff Brennan

(57) ABSTRACT

A multifunctional food processor includes a host module, a first food processing module mounted on the host module and driven by the host module, and a second food processing module driven by the first food processing module. The multifunctional food processor adopts multiple usage modes. The first food processing module and the second food processing module can independently process food materials, respectively. The multifunctional food processor achieves multi-purposes, is easy to operate, has simple implementation mode, and saves placement space for users.

6 Claims, 15 Drawing Sheets

(58) Field of Classification Search
USPC ......... 99/325, 326, 331, 334, 337, 339, 340,
99/341, 342, 348, 352, 353, 355, 357,
99/403, 407, 410, 413, 423, 443 C, 461,
99/462, 468, 484, 485, 486, 489, 492,
99/495, 501, 502, 503, 505, 508, 509,
99/510, 511, 512, 513, 537, 538, 584,
99/595; 366/199, 205, 244, 249, 272
See application file for complete search history.

(56) References Cited

U.S. PATENT DOCUMENTS

| 2013/0233181 A1* | 9/2013 | Allen | A47J 27/004 |
| | | | 99/337 |
| 2014/0272059 A1* | 9/2014 | Krebs | A23L 5/13 |
| | | | 426/510 |
| 2017/0251880 A1* | 9/2017 | Saunders | B26D 3/11 |

FOREIGN PATENT DOCUMENTS

| CN | 204970986 U | | 1/2016 | |
| CN | 105816071 A | * | 8/2016 | |
| CN | 106859397 A | | 6/2017 | |
| EP | 2085005 A1 | * | 8/2009 | ............ A47J 43/085 |
| EP | 2085005 A1 | | 8/2009 | |
| EP | 2934252 A1 | | 10/2015 | |
| EP | 3075295 A1 | | 10/2016 | |
| FR | 2641458 A1 | | 7/1990 | |

OTHER PUBLICATIONS

Pommerel Vincent, Espacenet Translated Specification of Patent Application of EP2085005A1 (Year: 2009).*
International Search Report and Written Opinion dated Jun. 15, 2018, in related PCT Application No. PCT/CN2018/079148.
International Search Report and Written Opinion dated Nov. 20, 2019, in related PCT Application No. PCT/CN2018/079148.

* cited by examiner

MULTIFUNCTIONAL FOOD PROCESSOR

The application is a National Phase entry of PCT Application No. PCT/CN2018/079148, filed on Mar. 15, 2018, which claims the priority to Chinese patent application No. 201710162529.7 titled "MULTIFUNCTIONAL FOOD PROCESSOR", filed with the China National Intellectual Property Administration on Mar. 18, 2017, which are incorporated herein by reference in their entireties.

FIELD

The present application relates to machines in the field of food processing, and in particular to a multifunctional food processer.

BACKGROUND

With the improvement of people's living standards, traditional tools for processing food material are unable to meet the requirements of users. For example, for cutting vegetables or meat into pieces, there are vegetable cutters that can cut the vegetables or the meat into pieces on the market currently. However, another tool is required to be used when the food material is shredded or sliced by the users. Therefore, user has to purchase a variety of different food material processing tools at home, which may occupy the space of the kitchen, and also increase the consumption for purchasing the machine.

In view of the above problems, a new type of food material processing tool is required to be designed to meet the users' requirements for multiple processing methods of different food materials.

SUMMARY

The technology problem to be solved according to the present application is to provide a multifunctional food processor, which has the function of cutting food material into pieces and can achieve the function of continuous shredding and slicing.

To solve the above technology problem, a following technology solution is provided according to the present application. A multifunctional food processer is provided, which includes: a host module, a first food material processing module installed on the host module and driven by the host module, and a second food material processing module driven by the first food material processing module;

the multifunctional food processor includes multiple usage modes, in a first mode, the first food material processing module is provided with a food material processing tool, which is driven to rotate independently by the host module, and the food material is separately processed by the food material processing tool of the first food material processing module; and in a second mode, the first food material processing module is only provided with a transmission shaft, which is driven to rotate by the host module to drive a rotary cutter head provided in the second food material processing module to rotate, and the food material is only processed by the second food material processing module.

Preferably, the multifunctional food processor further includes a third mode. In the third mode, the first food material processing module is provided with a rotary cutter, which is driven to rotate by the host module to drive the rotary cutter head provided in the second food material processing module to rotate, and the food material is processed by the second food material processing module and then processed by the first food material processing module.

Preferably, the host module is horizontally placed. The first food material processing module is installed and placed above the host module, and the second food material processing module is installed and placed above the first food material processing module.

Preferably, the first food material processing module includes a cooking cup, which is provided with the food material processing tool or a transmission shaft, and the food material processed by the second food material processing module is fell into the cooking cup of the first food material processing module.

Preferably, the host module includes a housing, a driving motor provided in the housing, and a driving shaft driven by the driving motor and extending upward from the housing, the first food material processing module is placed above the host module, and the driving shaft extends upward into the cooking cup of the first food material processing module.

Preferably, a bottom of the rotary cutter head of the second food material processing module is provided with an engaging tooth portion, and a top end of the transmission shaft and a top end of the food material processing tool of the first food material processing module are respectively provided with a transmission tooth portion that is engaged with the engaging tooth portion.

Preferably, a center of a bottom of the rotary cutter head of the second food material processing module is provided with a concave central hole, the top end of the food material processing tool of the first food material processing module is provided with a positioning shaft accommodated in the center hole, and the food material processing tool is rotatable about the center hole.

Preferably, the second food material processing module includes a base covered on the cooking cup of the first food material processing module, in a case that the first food material processing module is separately used to process the food material, the base is openable and then the food material is placed into the cooking cup.

Preferably, the rotary cutter head of the second food material processing module is in a shape of a taper, and the rotary cutter head is installed on the base and extends downward into the cooking cup.

Preferably, an inner side of the base is provided with a boss protruding inward, the rotary cutter head comprises a cutter head base and a cutter head holder, the cutter head holder is in a shape of a taper, and a large diameter end of the cutter head holder protrudes outward along a radial direction to form the cutter head base; and the cutter head base is provided on the boss, and the cutter head holder extends downward into the cooking cup.

Preferably, the food material processing tool of the first food material processing module includes: a rotatory cutting blade and a juicer cutting and stirring rod.

Compared with the conventional technology, the multifunctional food processor according to the present application has at least two food material processing modules, and the two food material processing modules can separately process the food material or process the food material in combination in a comprehensive manner. Multiple food material processing modes can be achieved by only using the multifunctional food processor according to the present application, the implementation method is simple, the operation is easy, and space can be saved for the user.

DETAILED DESCRIPTION

At present, a food processor on the market cannot meet the users' requirements for multiple processing methods of food materials. Multiple different food processors are required to be purchased by the users in the single processing method, which may occupy a large amount of kitchen space for placing various types of the above food processors, and increase the user's cost and expense for purchasing food processors.

In view of the defects in the conventional technology, a multifunctional food processor is provided according to the present application, which can realize multiple different processing methods for different food materials, is convenient for the users to use and improves the using experience for the users.

The technical solutions according to embodiments of the present application are described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of the present application.

Figure 1:
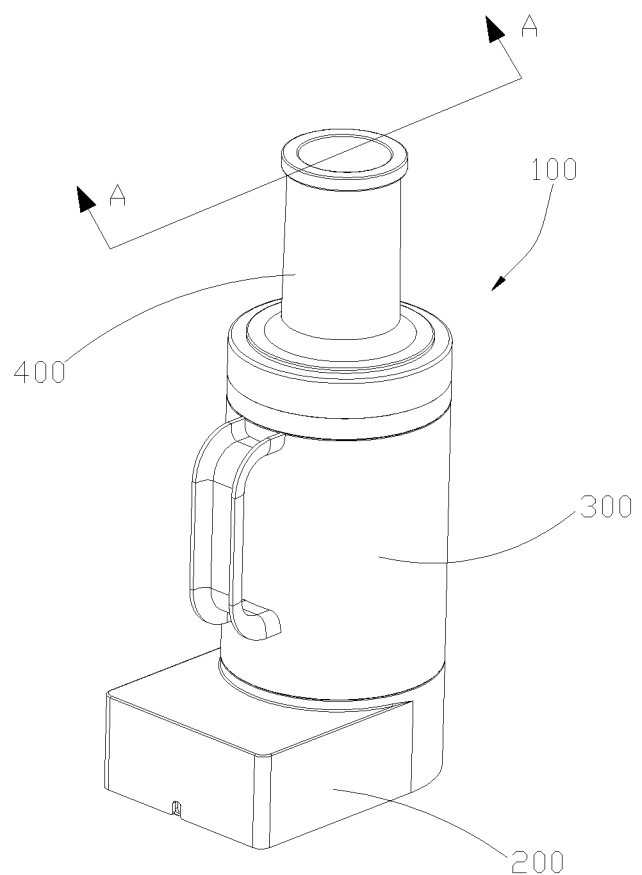
FIG. 1 is a perspective view of a multifunctional food processor according to the present application.
Figure 2:
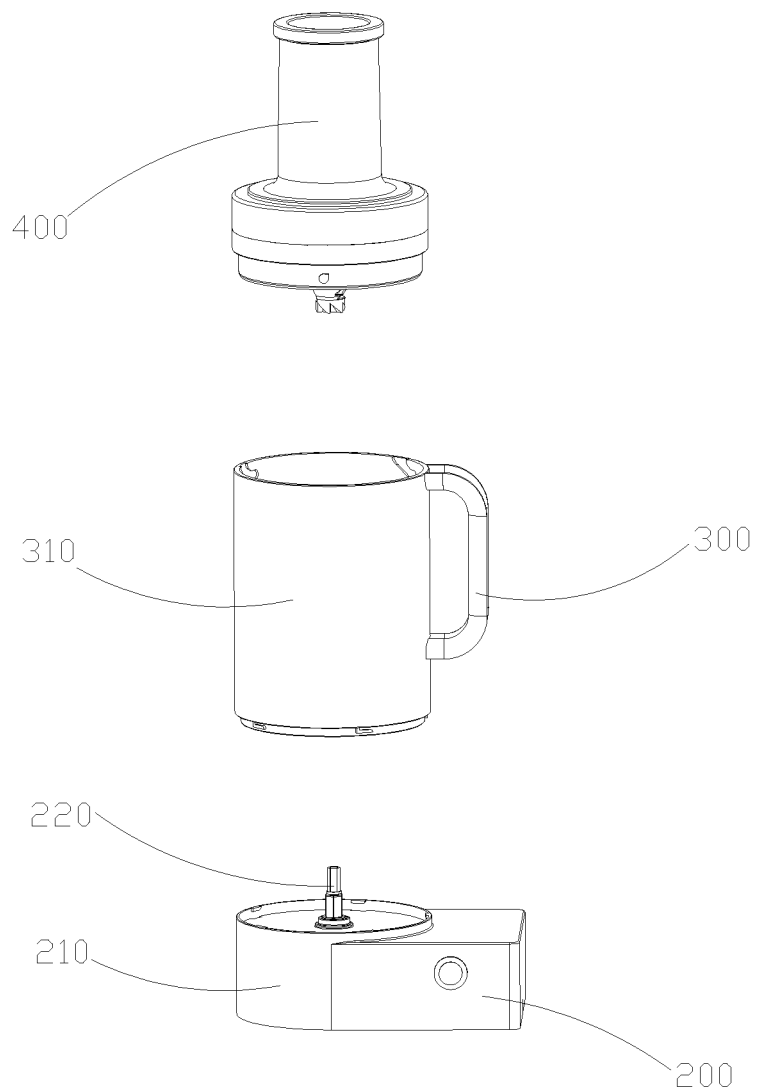
FIG. 2 is a partially exploded view of the multifunctional food processor shown in FIG. 1.
Figure 3:
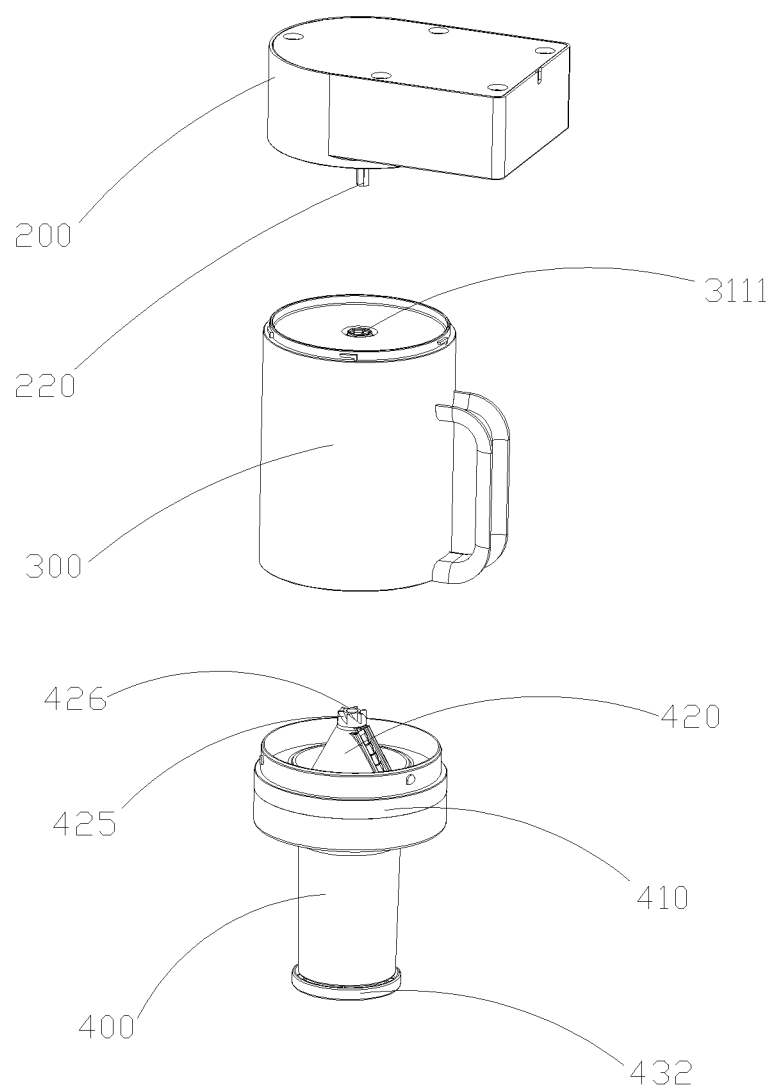
FIG. 3 is a partially exploded view of the multifunctional food processor taken from another angel shown FIG. 1.
Figure 4:
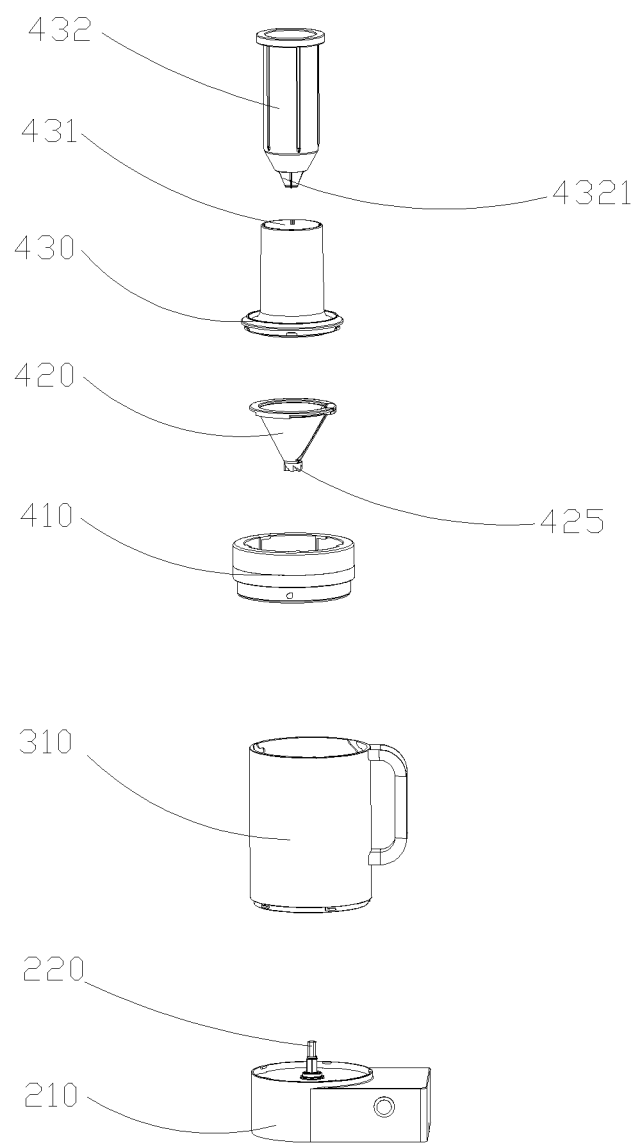
FIG. 4 is an exploded perspective view of a multifunctional food processor according to the present application.
Figure 5:
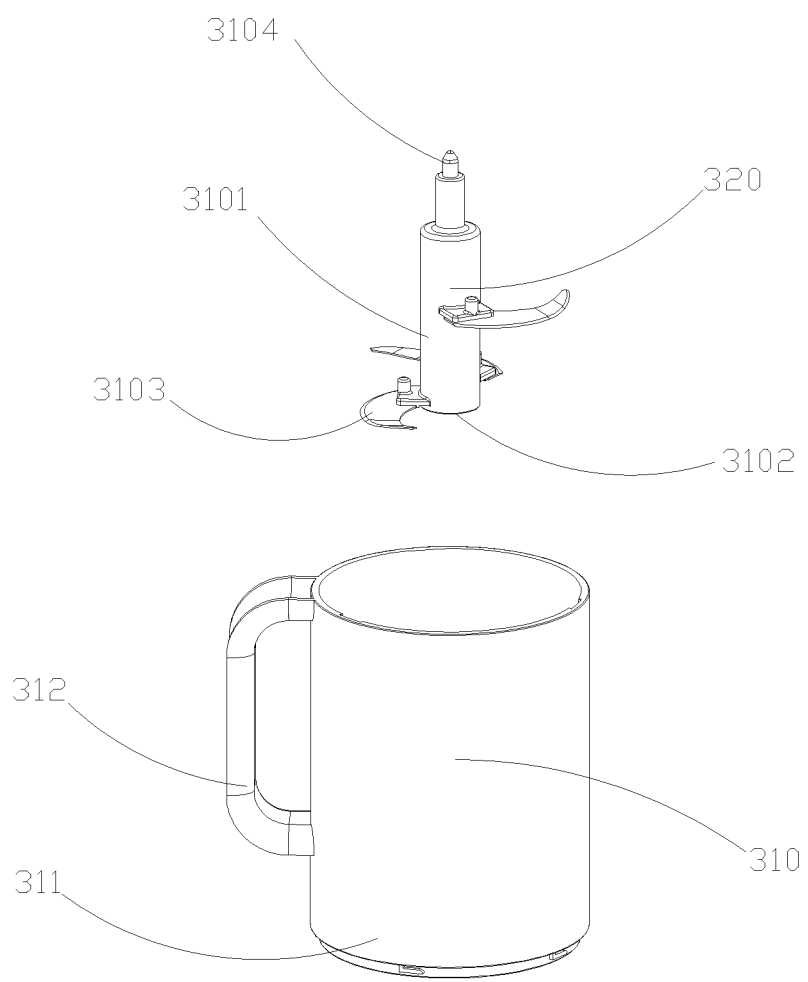
FIG. 5 is an exploded view of the first food material processing module in the first mode of the multifunctional food processor according to the present application.
Figure 6:
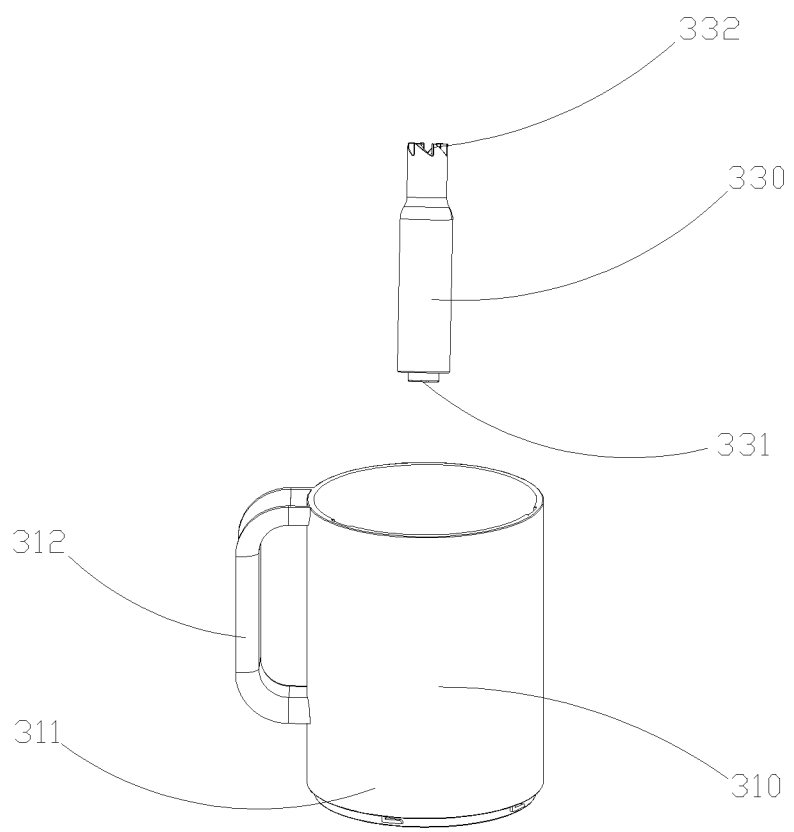
FIG. 6 is an exploded view of the first food material processing module in the second mode of the multifunctional food processor according to the present application.

Referring to FIGS. 1 to 21, as shown in FIG. 1, a multifunctional food processor 100 includes: a host module 200, a first food material processing module 300, and a second food material processing module 400. The host module 200, the first food material processing module 300 and the second food material processing module 400 are arranged one above another, that is, the first food material processing module 300 is installed above the host module 200, and the second food material processing module 400 is installed above the first food material processing module 300. The host module 200 is configured to be placed on a table. Referring to FIGS. 2 to 3, the host module 200 includes a housing 210, a driving motor (not shown) provided in the housing 210, and a gear reduction box (not shown) connected to the driving motor. The gear reduction box is provided with a driving shaft 220 that vertically passes out of the housing 210; the driving motor preferably employs a brushless DC motor. In other embodiments, the driving motor may also employ a series motor or other form of motor, which is not limited in the present application. The host module 200 is provided with an operation portion (not shown) for operating the multifunction food processor 100, and the operating portion can be used to turn on or turn off the multifunctional food processor, so as to control the speed of the driving motor or to achieve other functions. In the present application, the driving motor of the multifunctional food processor can be set as the functions of stepless speed regulation, multiple speed regulation or no speed regulation according to requirements.

Referring to FIGS. 3 to 7, the first food material processing module 300 includes: a substantially barrel-shaped cooking cup 310, a food material processing tool 320 provided in the cooking cup 310, and a transmission shaft 330 switchably used with the food material processing tool 320. The cooking cup 310 includes a cup body 311 and a handle portion 312 on one side of the cup body 311. The cup body 311 is open to an upper opening, and a bottom of the cup body 311 is provided with a through hole 3111 penetrating up and down. The cooking cup 310 is installed on the host module 200, and the driving shaft 220 of the host module 200 extends upward into an interior of the cooking cup 310. The food material processing tool 320 may be embodied as a rotary cutter, and the rotary cutter and the transmission shaft 330 are selectively (that is, alternatively) placed in the cooking cup 310. The rotary cutter is provided with a vertical main body 3101, a first shaft hole portion 3102, which is installed on the driving shaft 220 and is rotated by the driving shaft 220, at the bottom end of the main body 3101, multiple rotary cutting blades 3103 provided around the main body 3101, and a rotary positioning shaft 3104 protruding upward from a top end of the main body 3101. The driving shaft 220 drives the rotary cutter to rotate in the cooking cup 310 to cut the food material in the cooking cup 310.

Figure 7:
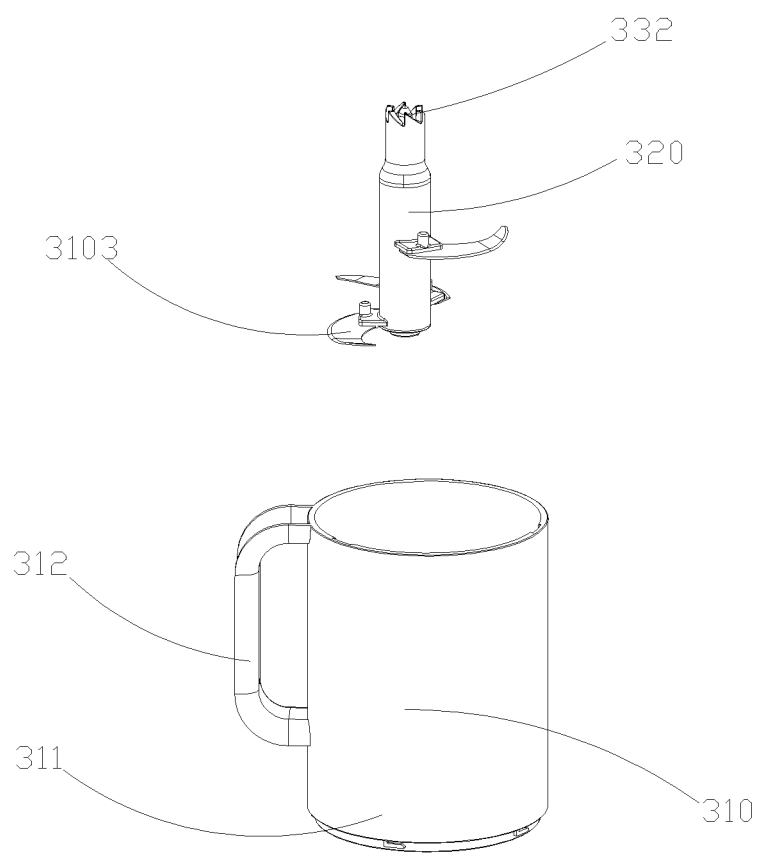
FIG. 7 is an exploded view of the first food material processing module in the third mode of the multifunctional food processor according to the present application.
Figure 8:
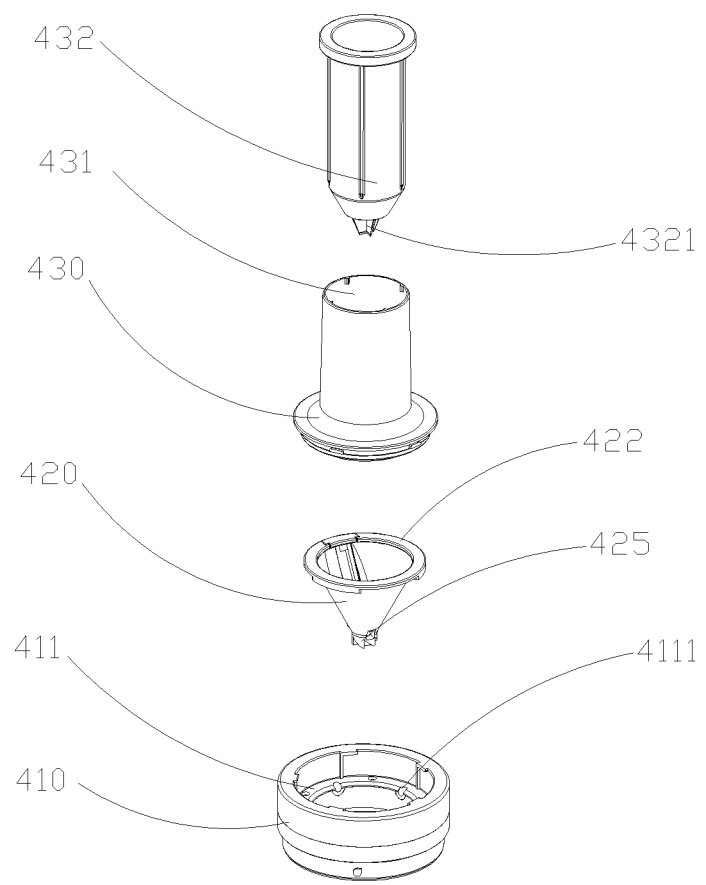
FIG. 8 is an exploded view of the second module of the multifunctional food processor according to the present application.
Figure 9:
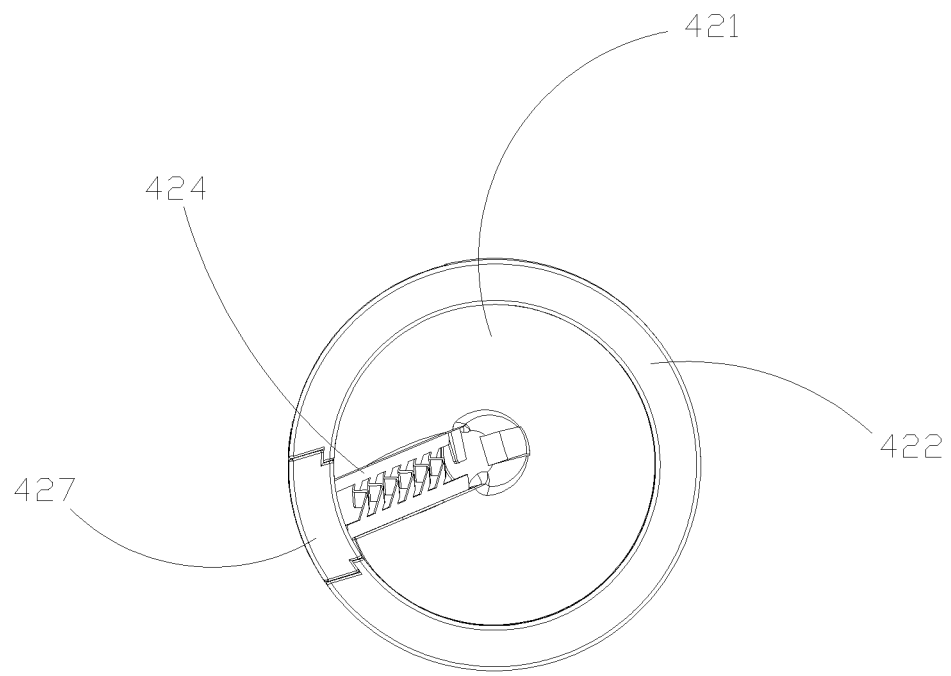
FIG. 9 is a perspective view of a rotary cutter head of the second module of the multifunctional food processor according to the present application, in which a cutting blade is installed in the rotary cutter head.
Figure 10:
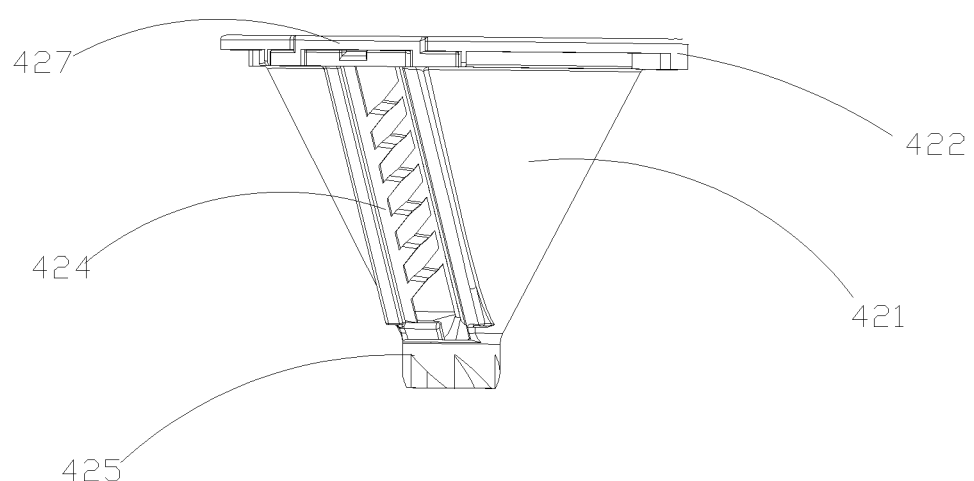
FIG. 10 is similar to FIG. 9 but taken from another angle.
Figure 11:
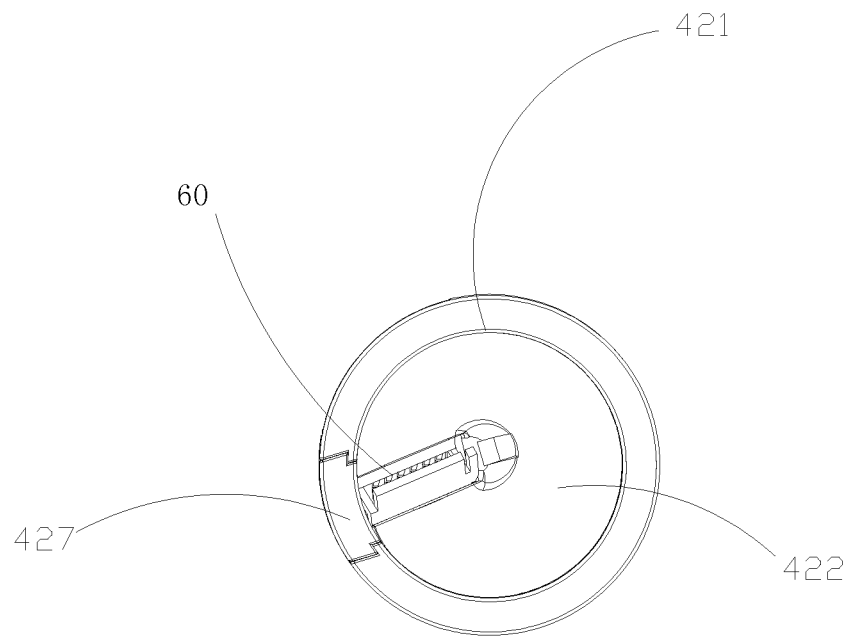
FIG. 11 is a perspective view of a rotary cutter head of the second module of the multifunctional food processor according to the present application, in which another cutting blade is installed in the rotary cutter.
Figure 12:
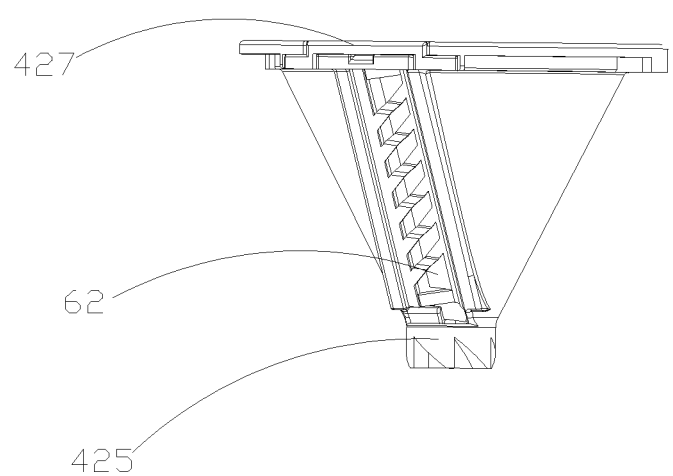
FIG. 12 is similar to FIG. 11 but taken from another angle.
Figure 13:
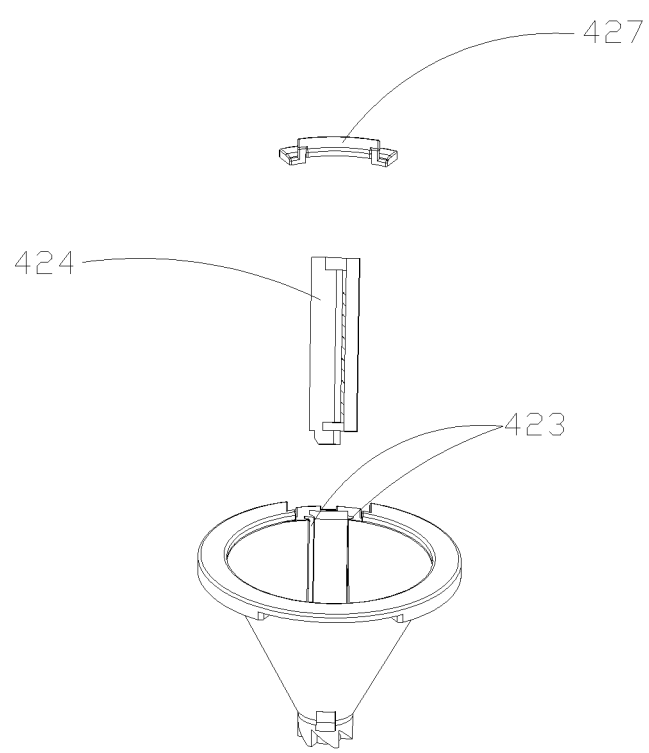
FIG. 13 is an exploded view of a rotary cutter head according to the present application.

The transmission shaft 330 may be installed on the driving shaft 220 instead of the rotary cutting blades. A bottom end of the transmission shaft 330 is provided with a second shaft hole portion 331 installed on the driving shaft, and a top end of the transition shaft is provided with a transmission tooth portion 332. As shown in FIG. 7, the top end of the main body 3101 of the rotary cutter may be provided with the above transmission tooth portion 332.

In other embodiments, the food material processing tool 320 in the cooking cup 310 may be provided with a stirring bar and a juice extracting cutter in addition to the above rotary cutter, so as to achieve multiple different food material processing modes in the same cooking cup 310.

Referring to FIGS. 8 to 13, the second food material processing module 400 is covered above the first food material processing module 300 and includes a base 410 covered above the cooking cup 310, a rotatory cutter head 420 installed on the base 410 and an upper cover 430 covered above the base 410. The base 410 is covered above the cooking cup 310, and an inner side of the base 410 is provided with a boss 411 protruding inward. The rotary cutter head 420 is provided with a substantially taper-shaped cutter head holder 421 and a cutter head base 422 protruding outward from the top (large diameter end) of the cutter head holder 421, and a tapered side of the cutter head holder 421 is provided with an installing groove 423 for installing cutting blades 424. The cutting blades 424 are installed on an inclined surface (that is, the tapered side surface) of the cutter head holder 421 from the installing groove 423. The tapered top of the cutter head holder 421 is provided with an engaging tooth portion 425 that rotates in engagement with the transmission tooth portion 332. The material food material processing tool 320 or the transmission shaft 330 in the first food material processing module 300 can drive the rotary cutter head 420 to rotate. The center of the engaging tooth portion 425 is provided with a concave central hole 426, and a positioning shaft 3104 at the top end of the food material processing tool 320 is accommodated in the center hole 426. The positioning shaft 3104 of the food material processing tool 320 is positioned in the center hole 426 and is rotatable in the center hole 426. The food processing tool 320 is driven by the driving shaft 220 to rotate. The transmission tooth portion 332 provided on the food material processing tool 320 and the transmission tooth portion 332 provided on the transmission shaft 330 can both be engaged with the engaging tooth portion 425 at the bottom end of the rotating cutter head 420 for transmission.

The rotary cutter head 420 is installed in the base 410 from top to bottom. The cutter head base 422 of the rotary cutter head 420 abuts downward against the boss 411 of the base 410. The cutter head holder 421 extends downward into the cooking cup 310. A ball 4111 located below the rotary cutter head 420 protrudes from the boss 411, that is, a ball 4111 is provided between the upper end surface of the boss 411 and the lower end surface of the cutter head holder 421. As such, it is smoother when the rotary cutter head 420 is rotated.

The upper cover 430 is installed above the base 410. A middle portion of the upper cover 430 is provided with a feed inlet 431 extending vertically upward and a material pushing rod 432 inserted into the feed inlet 431. A bottom of the material pushing rod 432 is arranged as an inverted taper shape substantially conforming to the contour of the tapered rotary cutter head 420, and the tapered top of the material pushing rod 432 is provided with a horizontal abutting block 4321 protruding further downward. The upper cover 430 abuts downward against the top of the rotary cutter head 420. The rotary cutter head 420 is rotated by the first food material processing module 300 between the upper cover 430 and the boss 411 of the base 410. The user puts the food material from the feed inlet 431 of the upper cover, and pushes the food material downward by the material pushing rod 432. When the rotary cutter head 420 rotates, the rotary cutter head 420 with different forms of the cutting blades is replaced according to the requirements of the user, so that the food material is processed in different forms, that is, the inclined cutting blades 424 can cut the food material into pieces or slice the food material.

The tapered side of the cutter head holder 421 of the rotary cutter head 420 is provided with a pair of installing grooves 423 for installing the cutting blades, and the cutting blades 424 are inserted from the tapered bottom of the rotary cutter head 420 upward into the installing grooves 423, and are completely accommodated in one side of the cutter head holder 421. A block 427 is installed on an outer side of the installing grooves on the tapered bottom of the cutter head holder 421, so as to prevent the cutting blades 424 from sliding out of the installing grooves 423 after being installed on the installing grooves 423.

Referring to FIGS. 17 to 21, the cutters in the rotary cutter head 420 can be embodied with different types of cutters according to different requirements. A cutter 50 capable of shredding and slicing is provided according to the present application, which is provided with two horizontally arranged cutter holders 51. The two cutter holders 51 are vertically offset and are arranged in height and low in a horizontal direction, that is, the two cutter holders 51 are not coplanar, and the planes of the two cutter holders 51 are parallel to each other. The front and rear ends of the two cutter holders 51 are connected together by a fixing plate 52. The cutter 50 is provided with multiple cutting edges 53 extending obliquely to connect the cutter holders on the two sides, and the cutting edges 53 are arranged and spaced apart along the extending direction of the cutter holder 51. Each of the cutting edges includes: an inclined portion 531 extending obliquely in the horizontal direction from the cutter holder 51 and a vertical portion 532 connecting the two inclined portions. The inclined portion 531 inclined from the cutter holder 51 is located in the same horizontal plane as the cutter holder 51, and the extending direction of the inclined portion 531 is provided at an angle with the extending direction of the cutter holder 51. The plane where the vertical portion 532 is located is perpendicular to the cutter holder 51. The projection of the cutting edges 53 in the plane perpendicular to the cutter holder 51 is in a shape of "Z".

When the cutter 50 with the "Z"-shaped cutting edge is installed to the rotary cutter head 420, the rotary cutter head 420 is rotated to cut the food material input from the feed inlet 431, and the food material may be cut into continuous filaments. According to the use of the cutter with different distances between the "Z"-shaped cutting edges, shredding or slicing may be achieved. As the distance between the "Z"-shaped cutting edges increases, the filaments cut from the food material by the rotating cutter head 420 are coarsened and thickened until become slices. After the cutter 50 is installed to the cutter holder 421, the "Z"-shaped cutting edges protrude inward from the tapered side of the rotary cutter head 420.

Another type of cutter 60 installed to the rotary cutter head is provided according to the present application. The cutter 60 has substantially the identical shape with the above cutter 50. A side of the cutter holder 61 of the cutter 60 is provided with horizontal cutting edges 62 extending horizontally to the other side of the cutter holder 61. The horizontal cutting edges 62 extend to one side and does not extend above the other side of the tool holder 61. In the present application, the cutter is provided with a flat horizontal cutting edge 62 at the front cutting end of the "Z"-shaped cutting edge 63. Before the food material is cut by the "Z"-shaped cutting edge 63, the food material is first cut into thin slices by the horizontal cutting edge 62, and then cut into filaments by the "Z"-shape cutting edge 63. Such arrangement makes the process easier when the hard food is shredded. Moreover, when the cutter 60 is used for shredding, the filament formed by the cutting of the food material is more complete and is not easily broken. Both the "Z"-shaped cutting edges 63 and the horizontal cutting edges 62 protrude inward from the tapered side of the rotary cutter head 420.

Figure 14:
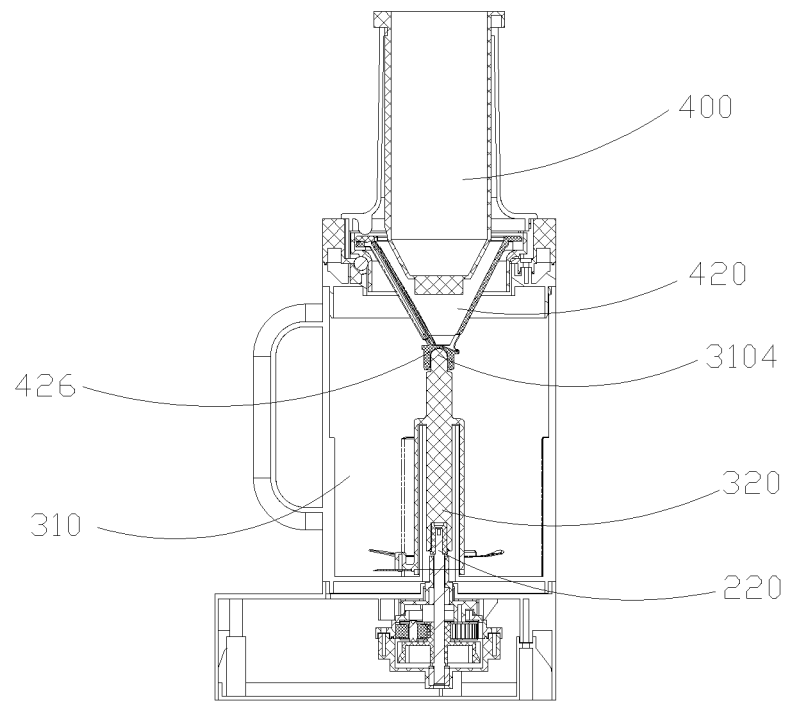
FIG. 14 is a cross-sectional view of the multifunctional food processor in the first mode along line A-A of FIG. 1 according to the present application.
Figure 15:
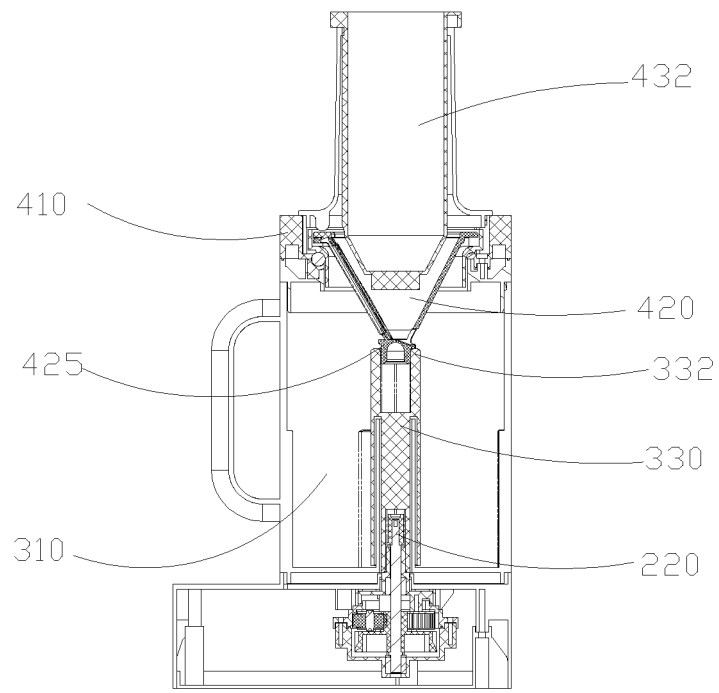
FIG. 15 is a cross-sectional view of the multifunctional food processor in the second mode along line A-A of FIG. 1 according to the present application.
Figure 16:
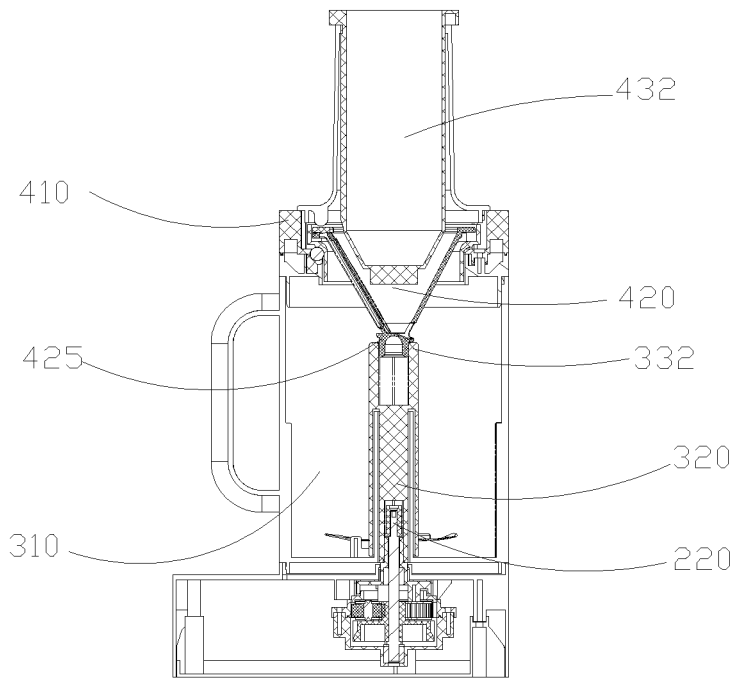
FIG. 16 is a cross-sectional view of the multifunctional food processor in the third mode along line A-A of FIG. 1 according to the present application.
Figure 17:
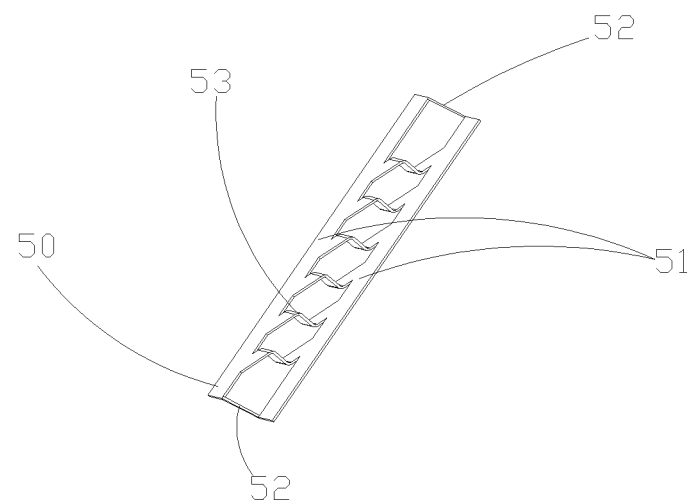
FIG. 17 is a perspective view of the cutting blade in the rotary cutter head of FIG. 9.
Figure 18:
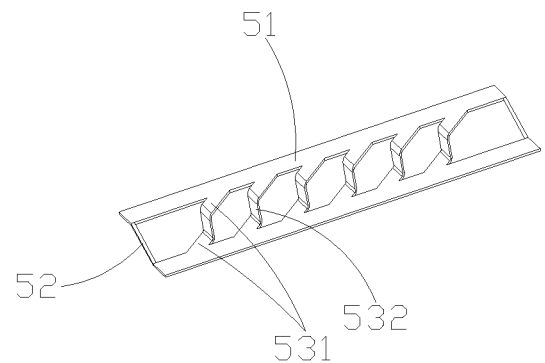
FIG. 18 is similar to FIG. 17 but taken from another angle.
Figure 19:
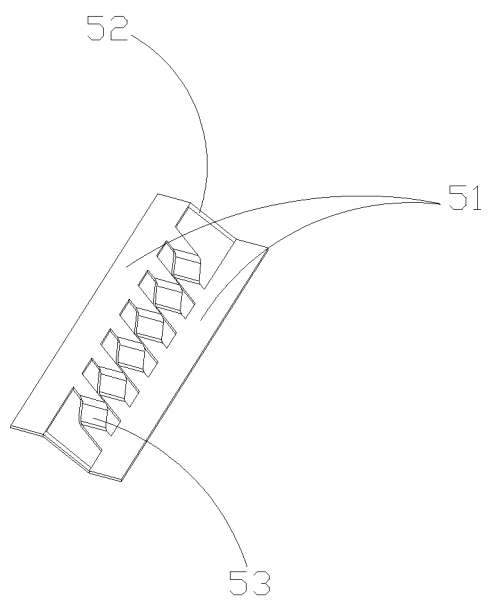
FIG. 19 is similar to FIG. 17 but taken from another angle.
Figure 20:
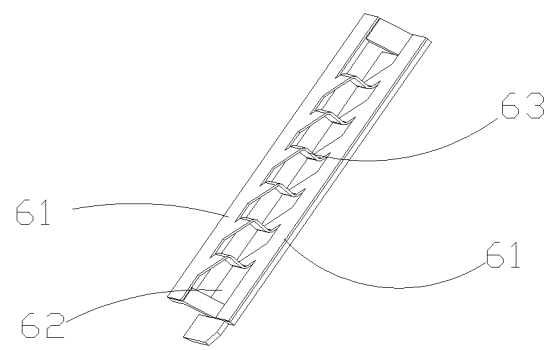
FIG. 20 is a perspective view of the cutting blade in the rotary cutter head of FIG. 11.
Figure 21:
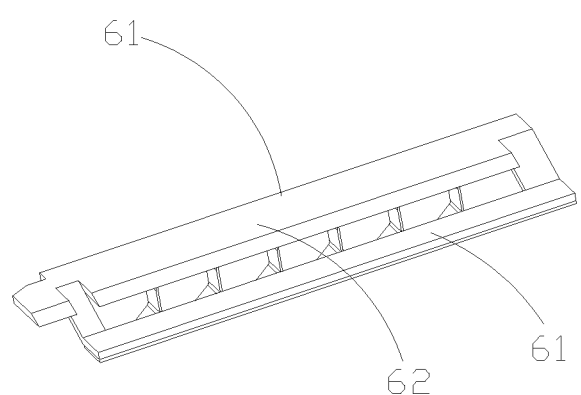
FIG. 21 is similar to FIG. 20 but taken from another angle.

Referring to FIGS. 14 to 16, the first food material processing module 300 is directly installed on the host module 200 according to the above description and is directly driven by the driving shaft 220 of the host module 200 to process the food material, and the second food material processing module 400 is driven to operate by the first food material processing module 300.

In a first embodiment of the present application, the first food material processing module 300 is provided as a food material processing tool 320, which may include: a rotary cutter and a stirring rod, etc., and the rotary cutter may be embodied as a cutting cutter and a high speed juice extruding cutter, etc.. The top end of the food material processing tool 320 is provided with a rotary positioning shaft 3104 protruding upward, and the rotating positioning shaft 3104 is positioned and accommodated in a central hole 426 at the bottom end of the rotary cutter head 420 of the second food material processing module 400, and is rotatable in the center hole 426 of the rotary cutter head 420. The food material processing tool 320 is driven to rotate by the driving shaft 220 of the host module 200. The rotary cutter head 420 of the second food material processing module 400 does not rotate. The user puts the food material into the cooking cup 310 of the first food material processing module 300, then covers the second food material processing module 400, and starts the multifunctional food processor 100 according to the present application, which can achieve separately processing the food material in the first food material processing module 300. The multifunctional food processor according to the present application can be equipped with multiple replaceable food material processing tools, which can achieve the functions of cutting vegetables, cutting meat, stirring, and juice extruding, has multi-purpose, and is convenient and does not take up too much space.

In a second embodiment of the present application, the first food material processing module 300 is provided with a transmission shaft 330. The transmission shaft 330 is installed on the driving shaft 220 of the host module 200 and is driven to rotate by the driving shaft 220. The top end of the transmission shaft 330 is provided with the transmission tooth portion 332, and the bottom end of the rotary cutter head 420 of the second food material processing module 400 is provided with the engaging tooth portion 425 that is engaged with the transmission tooth portion 332 of the transmission shaft 220. The food material processed by the second food material processing module 400 is fell into the cooking cup 310 of the first food material processing module 300. The food material can be processed with different forms according to the different cutters of the rotary cutter head 420 provided in the second food material processing module 400.

In a third embodiment of the present application, the first food material processing module 300 is further provided as the food material processing tool 320, and the top end of the food material processing tool 320 is modified into the transmission tooth portion from the rotary positioning axis in the second embodiment described above. The food material processing tool 320 in the first food material processing module 300 is linked with the rotary cutter head 420 of the above second food material processing module 400. The transmission tooth portion 332 of the food material processing tool 320 and the engaging tooth portion 425 at the bottom of the rotary cutter head 420 are engaged with each other. Thus, the food material can be processed two times. It can achieve that, for example, after the food material is fed into the second food material processing module 400 from the feed inlet 431 at the top end of the second food material processing module 400, the food material can be performed first processing by the rotary cutter 420, including but not limited to shredding and slicing. The food material processed by the second food material processing module 400 is fell into the cooking cup 310 of the first food material processing module 300, and the food material can be performed secondary processing by the food material processing tool 320 in the first food material processing module 300 in the cooking cup 310. After the food material is shredded and sliced in the second food material processing module 400, different food material processing tools can be set in the first food material processing module 300 by the user according to different requirements to further process the food material, such as: shredding, chopping, juice extruding and stirring.

The multifunctional food processor according to the present application has at least two food material processing modules, and the two food material processing modules can separately process the food material or process the food material in combination in a comprehensive manner. Multiple food material processing modes can be achieved by only using the multifunctional food processor according to the present application, the implementation method is simple, the operation is easy, and space can be saved for the user.

Based on the above description of the disclosed embodiments, the person skilled in the art can carry out or use the present application. It is obvious for the person skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

The invention claimed is:
1. A multifunctional food processer, comprising:
a host module;
a first food material processing module installed on the host module;
a second food material processing module installed on the first food material processing module;
a food material processing tool mountable in the first food material processing module;
a rotary cutter head installed in the second food material processing module;
a transmission shaft mountable in the first food material processing module;
wherein the first food material processing module comprises a cooking cup, the second food material processing module comprises a base covered above the cook- ing cup, the rotary cutter head installed on the base and an upper cover covered above the base, the first food material processing tool comprises a body and a shaft hole portion provided at a bottom end of the body, and the shaft hole portion is configured to be mounted on a driving shaft of the host module and rotated by the driving shaft, and cutting tools are provided around the body, wherein the multifunctional food processer comprises a plurality of usage modes, in a first mode, the food material processing tool is mounted in the first food material processing module, a top end of the body is configured to be a rotary positioning shaft, when in operation, the rotary cutter head of the second food material processing module does not rotate, and food material is processed by the food material processing tool of the first food material processing module;

in a second mode, the transmission shaft is mounted in the first food material processing module and the top end of the transmission shaft is configured to be a transmission tooth, when in operation, food material is processed by the second food material processing module and is accommodated by the first food material processing module after being processed by the second food material processing module; and in a third mode, the food material processing tool is mounted in the first food material processing module, the rotary positioning shaft is modified to be the transmission tooth, when in operation, the food material is processed by the second food material processing module and then processed by the first food material processing module.

2. The multifunctional food processer according to claim 1, wherein the host module is horizontally placed, the first food material processing module is installed and placed above the host module, and the second food material processing module is installed and placed above the first food material processing module.

3. The multifunctional food processer according to claim 1, wherein the host module comprises a housing, a driving motor provided in the housing, and the driving shaft driven by the driving motor and extending upward from the housing, the first food material processing module is placed above the host module, and the driving shaft extends upward into the cooking cup of the first food material processing module.

4. The multifunctional food processer according to claim 3, wherein a center of a bottom of the rotary cutter head in the second food material processing module is provided with a concave central hole, the rotary positioning shaft is accommodated in the center hole, and the food material processing tool is rotatable about the center hole.

5. The multifunctional food processer according to claim 1, wherein the rotary cutter head of the second food material processing module is in a shape of a taper, and the rotary cutter head is installed on the base and extends downward into the cooking cup.

6. The multifunctional food processer according to claim 5, wherein an inner side of the base is provided with a boss protruding inward, the rotary cutter head comprises a cutter head base and a cutter head holder, the cutter head holder is in a shape of a taper, and a large diameter end of the cutter head holder protrudes outward along a radial direction to form the cutter head base; and the cutter head base is provided on the boss, and the cutter head holder extends downward into the cooking cup.

\* \* \* \* \*